US010405270B1

(12) United States Patent
Govindassamy

(10) Patent No.: US 10,405,270 B1
(45) Date of Patent: Sep. 3, 2019

(54) ADAPTIVE INTERNET CONNECTIVITY SELECTION

(71) Applicant: MBIT WIRELESS, INC., Irvine, CA (US)

(72) Inventor: Sivakumar Govindassamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 182 days.

(21) Appl. No.: 15/432,297

(22) Filed: Feb. 14, 2017

(51) Int. Cl.
| | |
|---|---|
| *H04W 4/00* | (2018.01) |
| *H04W 48/18* | (2009.01) |
| *H04W 48/16* | (2009.01) |
| *H04W 8/18* | (2009.01) |
| *H04W 72/10* | (2009.01) |
| *H04W 24/02* | (2009.01) |

(52) U.S. Cl.
CPC ............ *H04W 48/18* (2013.01); *H04W 8/18* (2013.01); *H04W 24/02* (2013.01); *H04W 48/16* (2013.01); *H04W 72/10* (2013.01)

(58) Field of Classification Search
None
See application file for complete search history.

(56) References Cited

U.S. PATENT DOCUMENTS

| | | | | |
|---|---|---|---|---|
| 2009/0305701 | A1* | 12/2009 | Giaretta | H04L 12/5692 455/435.1 |
| 2014/0293829 | A1* | 10/2014 | Visuri | H04L 12/145 370/254 |
| 2015/0071068 | A1* | 3/2015 | Gupta | H04W 8/18 370/235 |
| 2016/0254993 | A1* | 9/2016 | Giaretta | H04L 12/5692 370/329 |
| 2017/0099228 | A1* | 4/2017 | Hunsperger | H04L 47/2441 |
| 2017/0150535 | A1* | 5/2017 | Wynn | H04L 63/0428 |
| 2017/0181114 | A1* | 6/2017 | Lu | H04W 60/00 |
| 2017/0279971 | A1* | 9/2017 | Raleigh | H04W 4/50 |
| 2017/0339619 | A1* | 11/2017 | Meylan | H04W 76/27 |
| 2018/0041482 | A1* | 2/2018 | Chang | G06F 3/1204 |
| 2018/0041943 | A1* | 2/2018 | Visuri | H04L 12/145 |
| 2018/0220283 | A1* | 8/2018 | Condeixa | H04W 4/44 |

* cited by examiner

*Primary Examiner* — Phirin Sam
(74) *Attorney, Agent, or Firm* — Lerner, David, Littenberg, Krumholz & Mentlik, LLP

(57) ABSTRACT

Internet access has become ubiquitous and the means by which it is obtained varies widely. A mobile Hotspot is a device that includes a modem for mobile broadband access and a Hotspot Access Point to distribute the internet to local devices which may have only WLAN connectivity. The internet service attributes such as data rate, latency, cost, performance, power consumption, and security vary widely depending on where and how the internet service is obtained such as using a mobile broadband connection or using wire-line connection. A method and apparatus are disclosed that enable adaptive and seamless selection of the best internet service from available networks considering a plurality of selection criteria including availability, data rate, latency, cost, performance, power consumption, and security. Methods for network selection based on user configurable priority or based on measurement of performance metrics or combination thereof are provided.

26 Claims, 14 Drawing Sheets

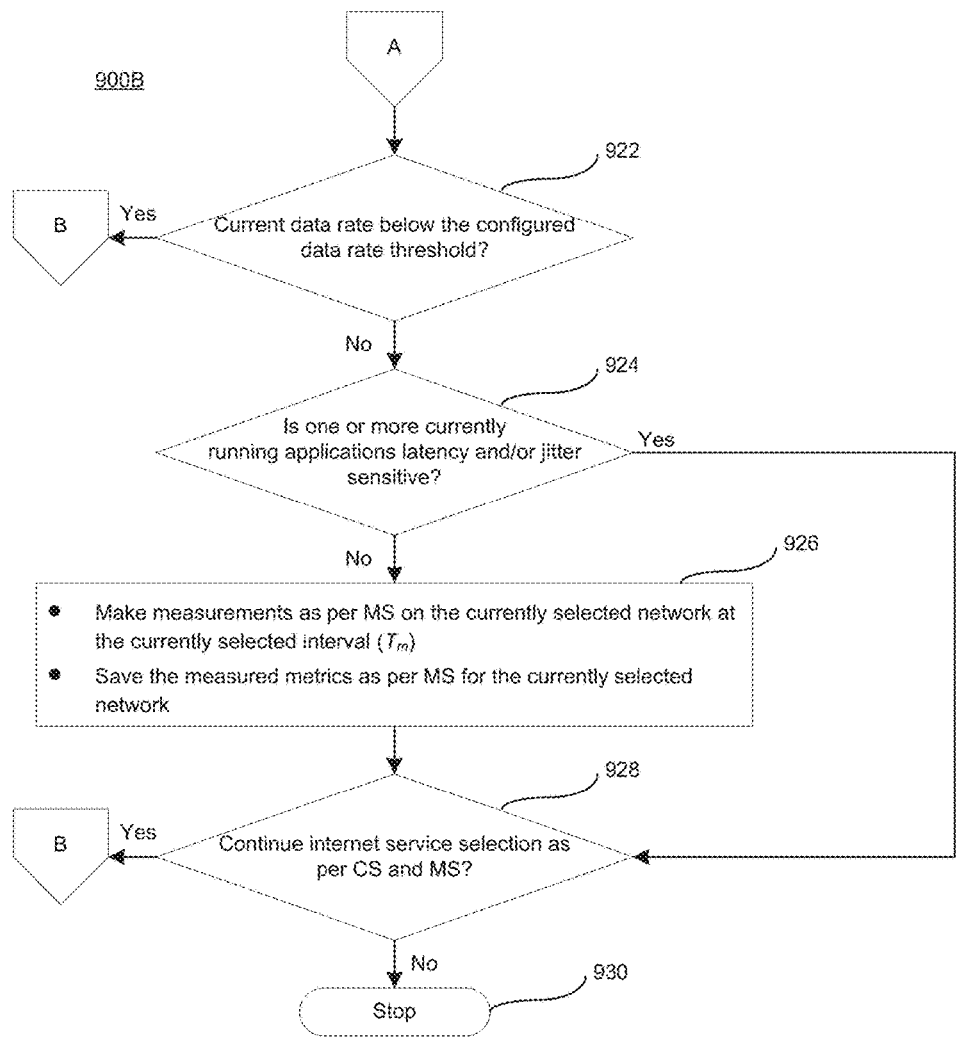

ADAPTIVE INTERNET CONNECTIVITY SELECTION

BACKGROUND

Internet access is becoming ubiquitous and the means by which the access is obtained varies widely. For example, the internet access may be through a Digital Subscriber Line (DSL), a cable modem, a fiber optic network, a wireless communication network, etc. When the internet service provides high data rates it is often referred to as broadband internet service. Broadband internet service is generally understood to be a service that is always on and offers data rates in the order of mega-bits per second for both download and upload.

A client device as defined in the present disclosure is a device that may access the internet from one or more of the sources from which the internet service may be available. Such client devices may include conventional devices such as a smartphone, a tablet, a feature-phone, a laptop or a desktop personal computer, etc. Other client devices may include devices that are embedded within devices that perform other functions such as an entertainment system in a home or in an automobile, a home appliance such as a refrigerator or washer/dryer, a wristwatch with a heart rate monitor, a medical device such as a blood pressure meter or insulin sensor, a utility meter, a gaming console, a camera, a navigation device, industrial equipment, etc. These types of devices are collectively referred to herein as machine type client devices.

These diverse types of client devices may access the internet service directly through one of the sources of primary internet access mentioned earlier. Alternatively, the client devices may access the internet through a local network that performs distribution of the primary internet access to the users localized in a given area. Examples of such local networks include Local Area Network (LAN) using Ethernet, Wireless LAN (WLAN) commonly known as Wi-Fi, or some other local area networking schemes. When a client device is in the proximity of a location where such a LAN or WLAN access is available, it may access the internet using the LAN or WLAN. FIG. 1 illustrates an example scenario of client devices accessing internet over a WLAN network, which is connected to a traditional wireline internet service such as DSL or cable modem. The local area where WLAN service is available is often referred to as Hotspot. The device that offers the WLAN service in a given local area is referred to as an Access Point (AP). In the present disclosure, the terms Hotspot AP or Hotspot are used interchangeably to refer the device that offers the WLAN service in a given local area.

A Hotspot AP may be connected to DSL or cable modem through any of the standardized interfaces such as Universal Serial Bus (USB), Ethernet, or proprietary interfaces. In some cases, the DSL or cable modem and the Hotspot AP may be part of a single physical device. In such cases the interface between the DSL or cable modem and AP may use Secure Digital Input Output (SDIO) or other suitable interface.

Client devices may also obtain internet access over mobile wireless networks. These mobile wireless networks are often referred to as Wireless Wide Area Network (WWAN). The internet service offered by such networks is often referred to as mobile broadband internet or Mobile Broadband (MB) and the mobile wireless networks are often referred to as mobile broadband networks. The terms WWAN and MB are used interchangeably herein.

A number of service attributes characterize an internet service. Some of these attributes include the data transfer rate, the latency, cost, power consumption, reliability, security, etc. The internet usage model may vary depending on the environment. A user may access internet for work related activities or for entertainment. The performance requirements, the form factor of the client device, the cost, etc. may also vary for different use cases. Since the wireless communication between the client device and the mobile broadband networks is done over relatively longer distances, in the order of several hundred meters to few kilometers, a client device in a WWAN may need to transmit in the uplink direction at a higher power compared to that of a client device communicating with the WLAN which operates in a smaller local area. For battery operated handheld client devices the power consumption may be an important consideration. Considering all the variations in the characteristics of internet service and usage scenarios, it may be desirable for a client device to get the internet access according to the selection criteria specified by the user for each of the attributes.

Often a user may have multiple client devices with different internet access capabilities. For example, a user may have a smartphone with mobile broadband and WLAN connectivity, and a machine type client device with WLAN connectivity but no mobile broadband connectivity. The machine type client device may get internet access when it is in the vicinity of areas where WLAN access is available. For example, when the user is at home, office or in public places such as a library or a café, the WLAN available in those locations may be used. However, when the user is not in vicinity of locations with WLAN, the machine type client device may not get internet access. If the machine type client device includes mobile broadband access connectivity then it may use the mobile broadband network for internet access.

As the variety of client devices has increased and the demand for MB access has increased, a device known as a mobile Hotspot is commonly used. A mobile Hotspot device includes both a modem for MB access and a WLAN AP (Hotspot AP) to distribute the internet to local client devices. FIG. 2 illustrates the block diagram of an example mobile Hotspot device. As shown in FIG. 2, for the chosen example, the MB modem and the Hotspot AP may be connected to each other via one of the standard interfaces used in the industry such as USB, SDIO, or proprietary interfaces. In another mobile Hotspot example, the MB modem and the WLAN AP may be a single Integrated Circuit (IC) as shown in FIG. 3.

Some mobile Hotspot devices may serve as a single function device, i.e., they only perform the mobile Hotspot function. Such mobile Hotspots may take many different form factors such as a mobile Hotspot integrated into an automobile, a standalone device that can be carried around with or without a battery, integrated into an accessory device for a tablet, a standalone device that can be powered by a wall outlet, etc.

Some client devices have multiple capabilities and being a Hotspot is one of the capabilities. For example, a smartphone may have a mobile broadband modem that may be used to get mobile internet service directly from the mobile broadband network as illustrated in FIG. 4. The flow of data is as shown in FIG. 4 from the mobile broadband modem to the application processor that processes the download and upload data and interacts with the user via the display and other elements of the user interface such as audio, vibration, etc. The smartphone may also have a WLAN modem to access internet service over a Hotspot AP. When it is in the vicinity of a Hotspot AP, it may use internet service from the Hotspot as illustrated in FIG. 1. In another smartphone example, the mobile broadband modem, the WLAN AP and the Application Processor may be integrated into a single Integrated Circuit (IC) as shown in FIG. 5.

A smartphone may also serve as a mobile Hotspot to provide internet service over WLAN to other client devices in its vicinity. FIG. 6 illustrates an example scenario where the smartphone serves as a mobile Hotspot and provides internet service to a machine type client device which may have only a WLAN access. In another smartphone mobile Hotspot example, the mobile broadband modem, the WLAN AP and the Application Processor may be integrated into a single IC as shown in FIG. 7.

A mobile Hotspot may be a part of an accessory or peripheral device for a client device such as a tablet. Other examples of such accessory or peripheral device may include a standalone mouse, a battery pack, a cover, a stand or any machine type client device. FIG. 8 illustrates an example scenario where a cover or a stand for a tablet includes mobile Hotspot connectivity. The mobile Hotspot may be connected with the tablet client device using a physical connection such as General Purpose Input/Output (GPIO) lines, Inter-Integrated Circuit (I2C) bus, Universal Asynchronous Receiver/Transmitter (UART), USB, SDIO or any other standardized or proprietary interfaces. While the actual data transfer between a client device and the mobile Hotspot may occur over the WLAN connection, some of the control, such as power on and off, and configuration may be carried out over the physical connection. In another example scenario the actual data transfer between the client device and the mobile Hotspot may occur over the physical connection or over the combination of both physical connection and the WLAN connection.

A client device may use a mobile Hotspot, a Hotspot, or a mobile broadband network when internet access is required. An example of a mobile broadband network is the Long Term Evolution (LTE) from the $3^{rd}$ Generation Partnership Project (3GPP). The LTE technology and its evolution are often referred to as fourth generation (4G) technologies. A client device may also use any of the previous generation technologies such as "2G", "3G" from 3GPP and other standardization bodies. A client device may also use future generation technologies for Hotspot, mobile Hotspot, and mobile networks. Different sources of internet are generically referred to as networks herein. A mobile broadband network may comprise a number of cells that collectively offer internet service over a wide area. For the purpose of the present disclosure, each cell of a mobile broadband network is treated as a separate network whose internet service may be compared against that of other cells of the same mobile broadband network, Hotspots, and mobile Hotspots. When a distinction is required, more specific terms are used. A network that is detected by a client device and is able to provide internet service is referred to herein as available network. If a client device has obtained internet service from a network in the past, then it is referred to herein as previously visited network. A client device may continually search and select the best available network for a given use case considering the performance, latency, power consumption, cost, security and other factors. Conventional methods for the selection of the best available network may not differentiate between the Hotspots, mobile Hotspots, and mobile broadband networks which may lead to selection of a network that may not be optimum according to the various selection criteria.

SUMMARY

A method and apparatus are disclosed that enable selection of a best available network according to user configured criteria and priority in an autonomous manner that may result in better user experience.

In accordance with an aspect of the present disclosure, a method for selecting an available network for accessing internet service may include controlling, by a processing device, at a client device, setting selection criteria for accessing internet service; storing service attributes respectively of networks previously visited by the client device; periodically updating an ordered list of available networks using the selection criteria and the service attributes respectively of the networks previously visited, and based on network availability at a given time; and selecting a selected network from the ordered list.

In one alternative, the selection criteria may include at least one of type of network, cost of network service, privacy, security, data rate, latency or jitter.

In one alternative, the type of network may include at least one of a Hotspot, mobile Hotspot, mobile broadband network or roaming mobile broadband network.

In one alternative, the data rate may include at least one of minimum data rate, peak data rate, average data rate or guaranteed data rate.

In one alternative, at least one selection criterion of the selection criteria may be selectable by a user as a priority selection criterion for selecting the selected network.

In one alternative, a priority of a first selection criterion of the selection criteria may be different from or same as a priority of a second selection criterion of the selection criteria, for selecting the selected network.

In one alternative, the service attributes for a given network of the networks previously visited may be indicated in a given measurement set (MS) for the given network, in which the given MS indicates given MS elements which are measurable at the client device at least one of when establishing a connection with the given network, during the connection with the given network, or when switching from the given network to a different second network.

In one alternative, MS information may be stored respectively for a predetermined maximum number of the networks previously visited.

In one alternative, a first selection criterion of the selection criteria may be based on a first measurement obtained for a first measurement element of a first MS for a first network of the networks previously visited.

In one alternative, the given MS for the given network may include, as a first MS element, at least one of a keep-alive time stamp for a most recent scan result, a duration of a most recent connection, average duration of a connection, reason for switching from a last network, network switching rate, data rate obtained during a last connection, number of random access attempts before a response is received from the given network when attempting to establish a connection during a last visit, block Error Rate or block retransmission rate.

In one alternative, the reason for switching may include at least one of connection lost, data rate, cost or security.

In one alternative, the data rate obtained during the last connection may include at least one of minimum data rate, peak data rate or average data rate.

In one alternative, a first selection criterion of the selection criteria may be other than from MS information.

In one alternative, the method may include controlling, by the processing device, accessing Internet service at the client device using the selected network.

In one alternative, the method of claim may include, when a currently active connection to a first network at the client device is a delay sensitive application, controlling, by the processing device, deferring measuring first MS elements for the first network until the delay sensitive application is ended.

In one alternative, the delay sensitive application may be a voice or video call.

In one alternative, the method may include, when a currently active connection to a first network at the client device is a delay tolerant application, controlling, by the processing device, measuring first MS elements for the first network while the active connection is ongoing and without waiting until the active connection ends.

In one alternative, the method may include controlling, by the processing device, when the client device is active, scanning for an available network according to the selection criteria at a first scan interval smaller than a predetermined value; and when the client device is not active, scanning for an available network according to the selection criteria at a second scan interval greater than the predetermined value.

In one alternative, the method may include controlling, by the processing device, when the client device is connected to an external power supply, scanning for an available network according to the selection criteria at a first scan interval smaller than a predetermined value; and when the client device is not connected to the external power supply and operating using power from a battery of the client device, scanning for an available network according to the selection criteria at a second scan interval greater than the predetermined value.

In one alternative, the method may include controlling, by the processing device, when the client device is currently connected to a first network which is determined to satisfy selected one or more of the selection criteria and the MS elements respectively of the networks previously visited, scanning for an available network at a first scan interval smaller than a predetermined value.

In one alternative, the method may include controlling, by the processing device, when the selected network has a Peak to Average Data Rate Ratio (PADRR) less than or equal to a threshold $T_{PADRR}$, performing measurements for the MS elements of the selected network at a measurement interval greater than a predetermined value, and when the selected network has the PADRR greater than the threshold $T_{PADRR}$, performing measurements for the MS elements of the selected network at the measurement interval greater less than the predetermined value.

In one alternative, the method may include controlling, by the processing device, when the selected network has a wired connection for internet service, performing measurements for the MS elements of the selected network at a measurement interval greater than a predetermined value.

In one alternative, the method may include controlling, by the processing device, generating a table listing preferred highest priority attribute from at least one of the service attributes or the MS elements respectively of the MSs of the networks previously visited, according to a type of application.

In one alternative, the method may include controlling, by the processing device, determining a potential selected network using the table and based on a given type of application running on the client device.

In one alternative, at least one of the setting of the selection criteria or measuring first MS elements of a first network may be performed according to a mobility condition of the client device.

In accordance with an aspect of the present disclosure, an apparatus for selecting an available network for accessing internet service may include circuitry configured to control setting selection criteria for accessing internet service; storing service attributes respectively of networks previously visited by the client device; periodically updating an ordered list of available networks using the selection criteria and the service attributes respectively of the networks previously visited, and based on network availability at a given time; and selecting a selected network from the ordered list.

In accordance with an aspect of the present disclosure, a wireless communication device may include a receiver to receive a wireless communication signal; and a processing device configured to control selecting an available network for accessing internet service, wherein the processing device is configured to control setting selection criteria for accessing internet service; storing service attributes respectively of networks previously visited by the client device; periodically updating an ordered list of available networks using the selection criteria and the service attributes respectively of the networks previously visited, and based on network availability at a given time; and selecting a selected network from the ordered list.

BRIEF DESCRIPTION OF THE DRAWINGS

FIG. 9A and FIG. 9B illustrate the high level flow diagram of adaptive selection procedure for internet access according to the aspects of the present disclosure.

DETAILED DESCRIPTION

Figure 1:
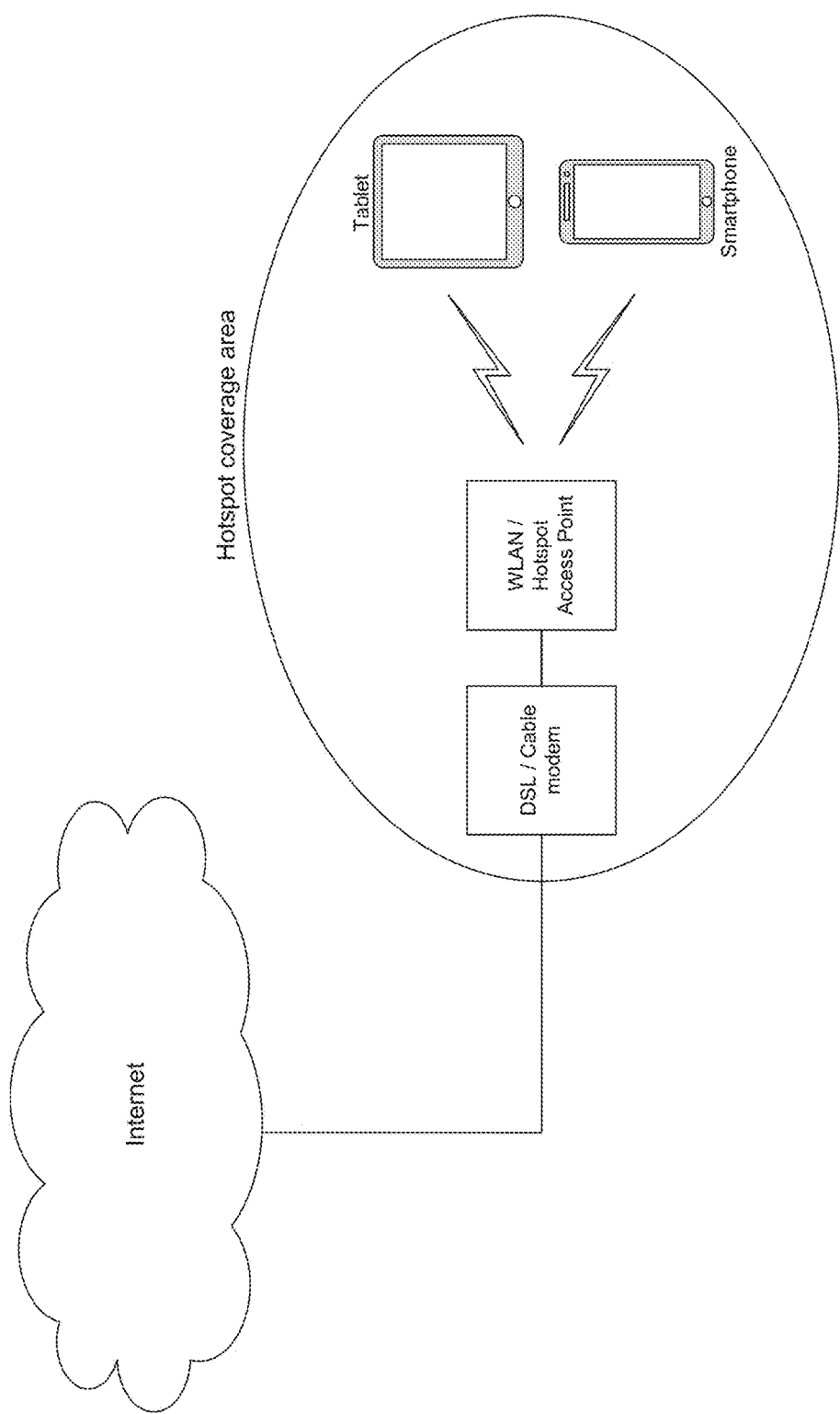
FIG. 1 illustrates an example scenario of internet access using WLAN network over a traditional wire-line internet service.
Figure 2:
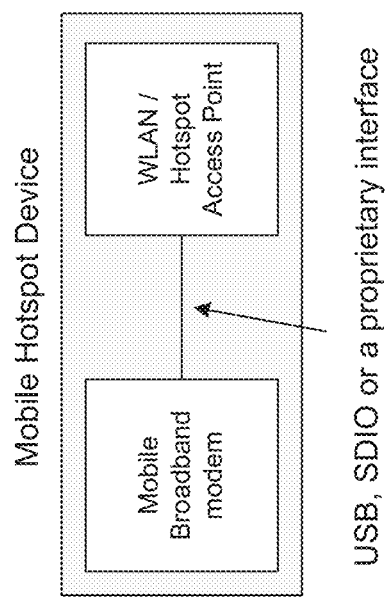
FIG. 2 illustrates a high level block diagram of a mobile Hotspot device.
Figure 3:
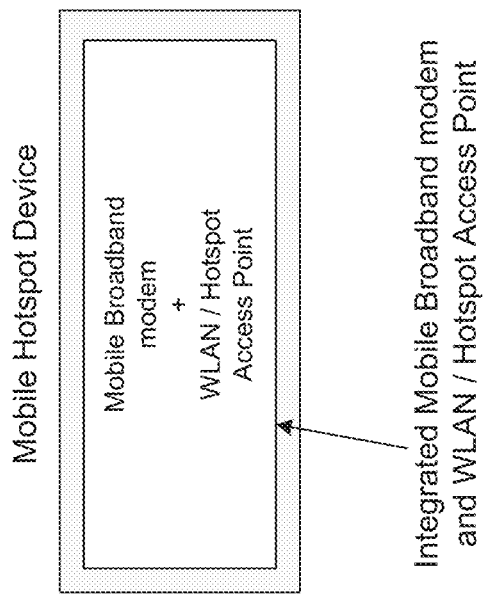
FIG. 3 illustrates a high level block diagram of an example mobile Hotspot device with an integrated mobile broadband modem and WLAN Access Point.
Figure 4:
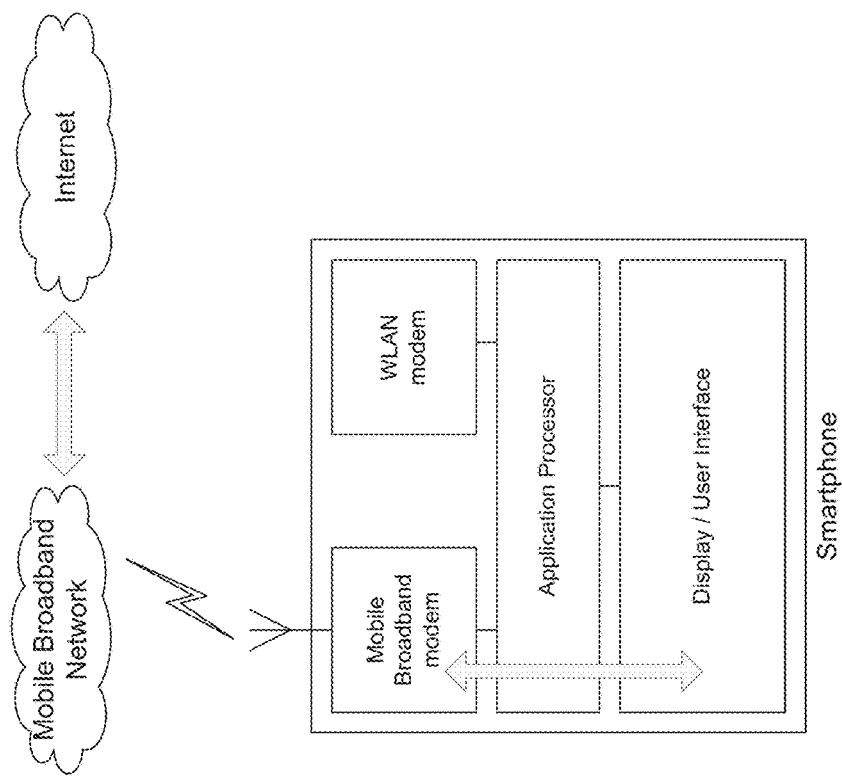
FIG. 4 illustrates a use case of internet access over a mobile broadband network by a smartphone client device.
Figure 5:
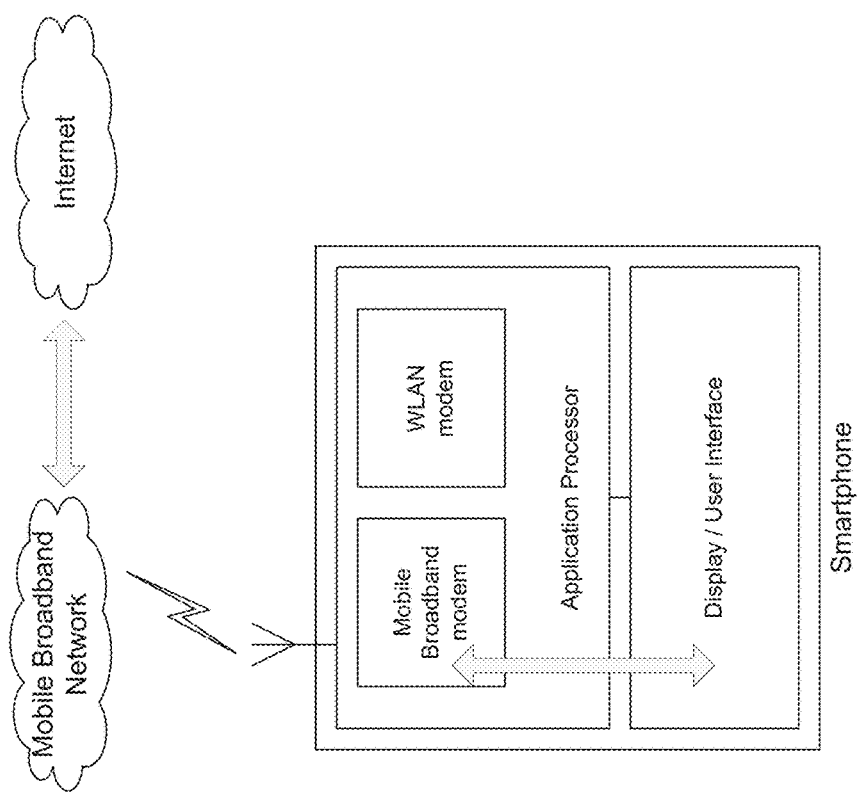
FIG. 5 illustrates a use case of internet access over a mobile broadband network by a smartphone client device with an integrated mobile broadband modem, WLAN Access Point, and Application Processor.
Figure 6:
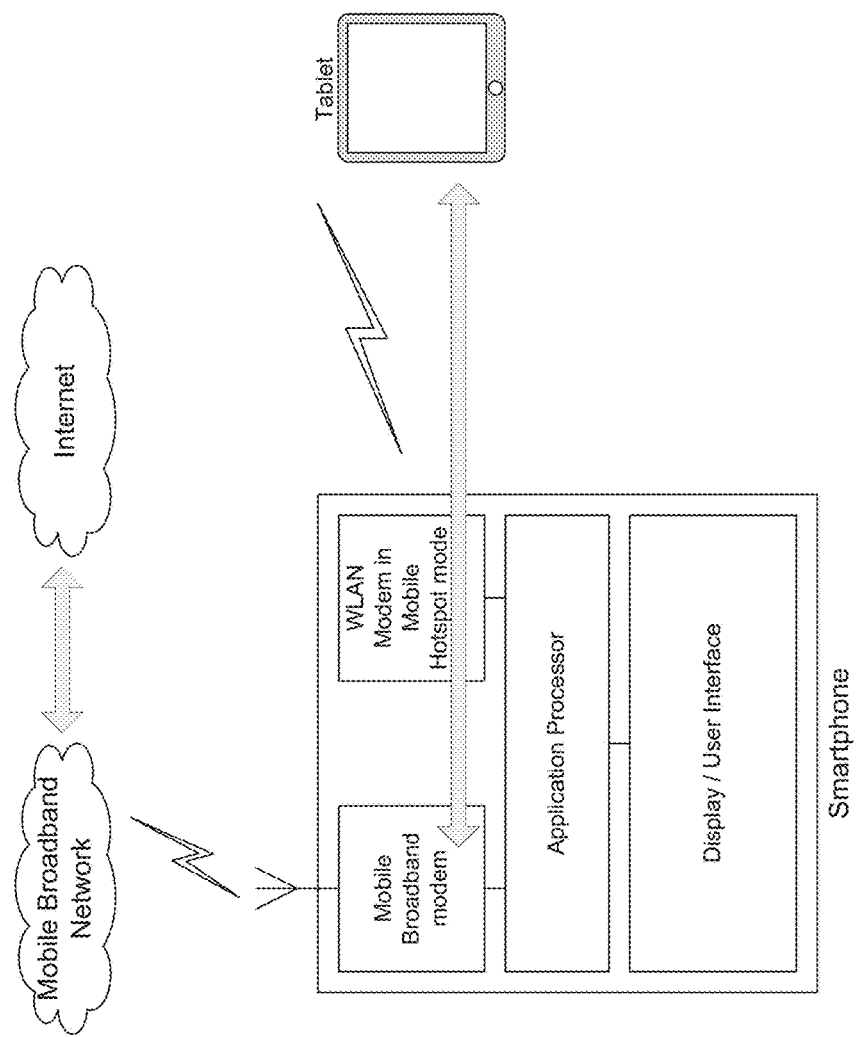
FIG. 6 illustrates a use case of internet access over a WLAN network by a client device through a smartphone operating in mobile Hotspot mode.
Figure 7:
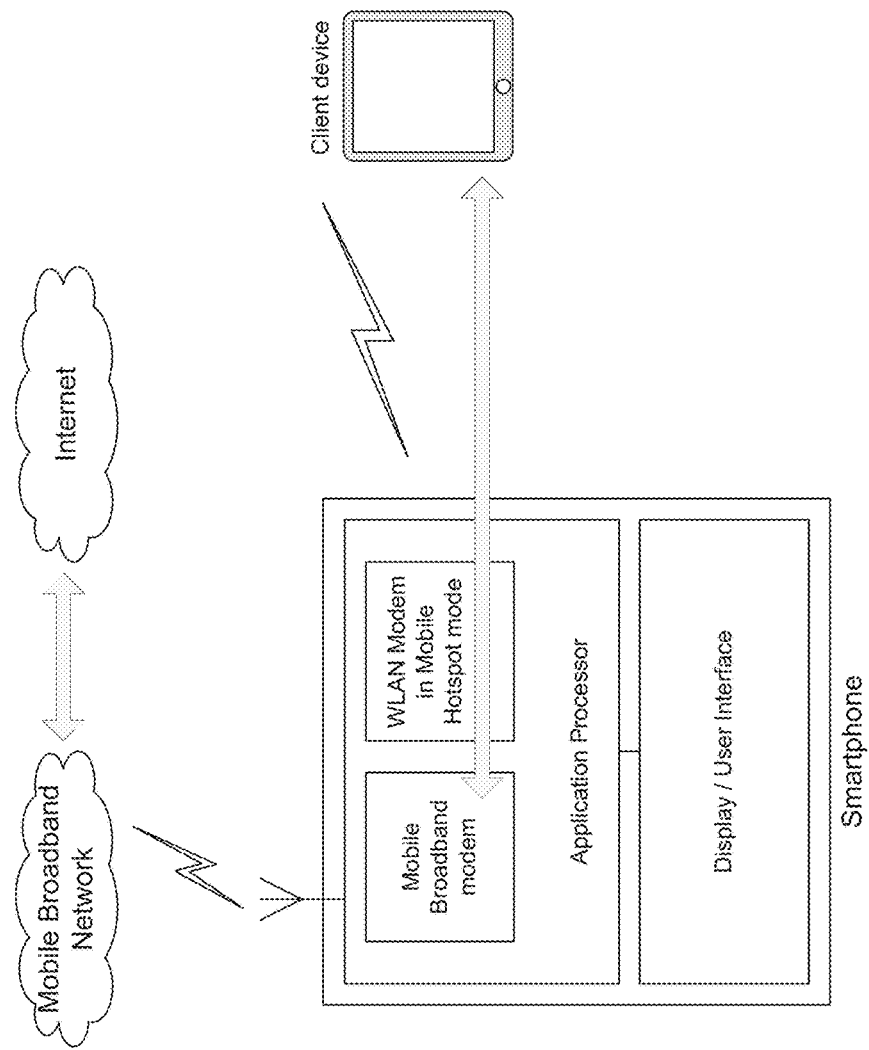
FIG. 7 illustrates a use case of internet access over a WLAN network by a client device through a smartphone operating in mobile Hotspot mode with an integrated mobile broadband modem, WLAN Access Point, and Application Processor.
Figure 8:
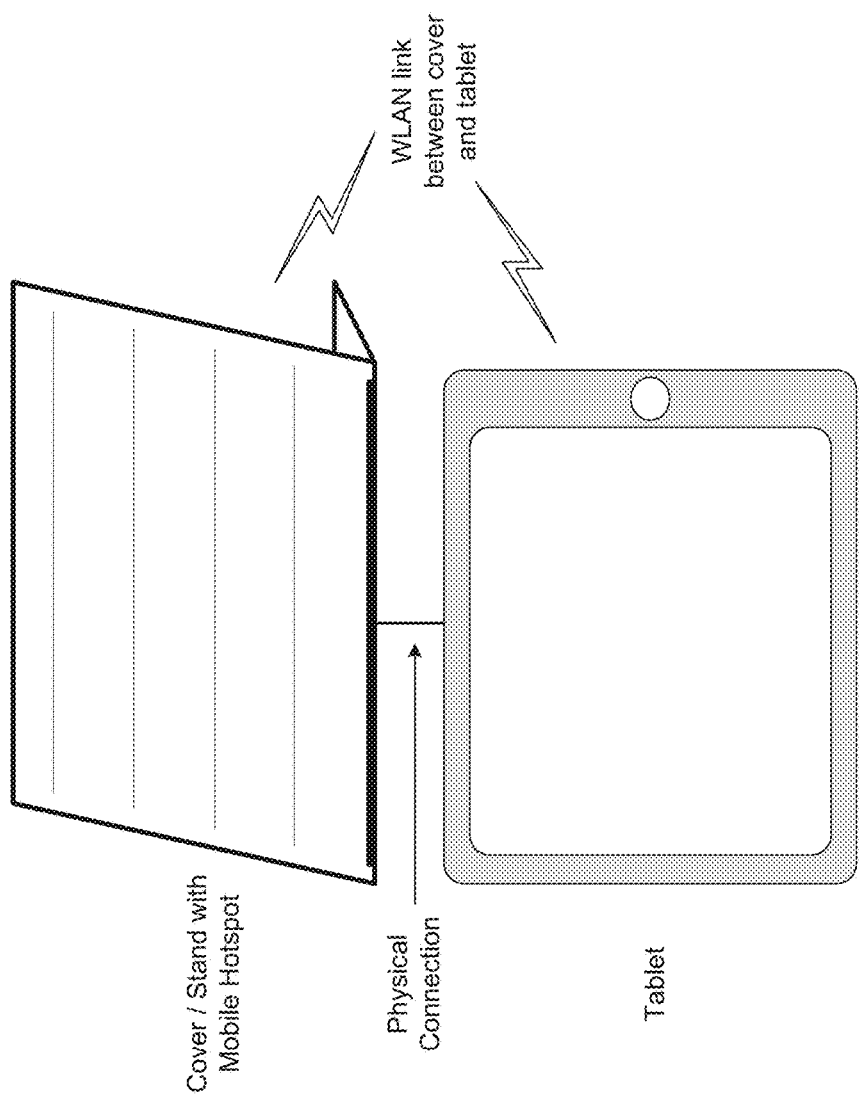
FIG. 8 illustrates a use case of tablet cover with mobile broadband modem offering internet access over a WLAN to a tablet client device and having a physical connection between the tablet and the cover.

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

Although aspects of the present disclosure are illustrated using a particular type of client device, the disclosure is applicable to any type of client device some of which are listed in an earlier section of the present disclosure.

The network conditions may change due to many scenarios that include but not limited to: user may be mobile, other users may join or leave the network, channel conditions may change, etc. The process of searching for all available networks for internet service is referred to herein as scanning. A client device may perform initial scanning to get internet service when powered up. A client device may continue to do periodic scanning for getting the most desirable or best internet service even while getting internet service from the currently selected network. It is understood that the scanning for the most suitable network may be performed without affecting the normal usage of the client device by the user.

According to an aspect of the present disclosure, a client device may maintain a set of selection criteria for accessing internet service. According to an aspect of the present disclosure, the internet service selection criteria may span across all available types of networks enabling selection across Hotspots, mobile Hotspots, mobile broadband networks, roaming mobile broadband networks, as well as older and newer generation mobile networks. A client device may have access to internet service from the same type of network from multiple sources at a given point of time. For example, a client device may have access to internet service from multiple Hotspots. A client device may have access to internet service from different types of networks from multiple sources at a given point of time. For example, a client device may have access to internet service from a Hotspot, a mobile Hotspot, and a mobile broadband network. According to an aspect of the present disclosure, a client device may save and maintain the service attributes of the previously visited networks. According to an aspect of the present disclosure, using the internet service selection criteria, the previously saved measurements on the internet service of visited networks and the available networks at a given time, the client device may create, use, and periodically update an ordered list of networks.

The internet service selection criteria, which may be user configurable, include but not limited to the following:
  Type of network
    Mobile Hotspot AP, wire-line Hotspot AP, mobile broadband network, roaming mobile broadband network, older or newer generation mobile network, etc.
  Cost
    Service from some networks may be more expensive than others
  Privacy
    Home Hotspot AP, for example, may be more private than a public Hotspot AP
  Security
    Whether encryption or other method to secure the data is used or not
  Data rate
    Minimum data rate
    Peak data rate
    Average data rate
    Guaranteed data rate
  Latency
    End-to-end delay from source to destination
  Jitter
    Variation in the latency for different packets being communicated The elements of selection criteria described above are referred collectively herein as Criteria Set (CS). According to an aspect of the present disclosure, a user may configure a single element from CS for setting priority. For example, a user may configure the cost as the single criterion to be used for internet service selection. In another example, a user may configure the "type of network" as the single criterion for internet service selection. According to an aspect of the present disclosure, a user may configure multiple elements, including all the elements, from CS for setting priority. Some elements of the CS may be configured to have the same priority whereas other elements may be configured to have different priority. For example, a user may configure the "type of network" as the first priority and the "cost" as the second priority for internet service selection.

A set of measurements and events include but not limited to the following for each visited network:
  Keep-alive time stamp for the most recent scan results. Whenever a network is detected by a client device, it may store the current time as the time stamp. Every time a scan is performed and if the network is detected, the time stamp may be updated.
  Duration of the most recent connection
  Average duration of the connection
  Reason for switching from the last network:
    Connection lost
    Data rate
    Cost
    Security
  Network switching rate
  Data rates obtained during last connection
    Minimum data rate
    Peak data rate
    Average data rate
  Number of random access attempts before a response was received from the network when attempting to establish connection during last visit
  Block Error Rate (or similar metric such as block retransmission rate, etc.) which may be used for assessing the connection reliability The elements of measurements and events described above are referred collectively herein as Measurement Set (MS). According to an aspect of the present disclosure, a client device may make measurements for one or more elements in the MS as applicable when establishing a connection with a network, during a connection with the network, and when switching from that network to another network. According to an aspect of the present disclosure, a client device may maintain the MS measurements for up to K visited networks. According to an aspect of the present disclosure, the measurements made for the elements in MS may be used for CS. For example, the average data rate measured by a client device may be used in CS as criteria for selecting a network for internet service. In another example, the security settings used for a connection at one time in a network may be considered in CS when making internet service selection based on security as priority criterion.

According to an aspect of the present disclosure, a subset or the entire set of MS elements may be used for CS. The set of elements in CS may be from MS and some elements may not be from MS.

Figure 9A:
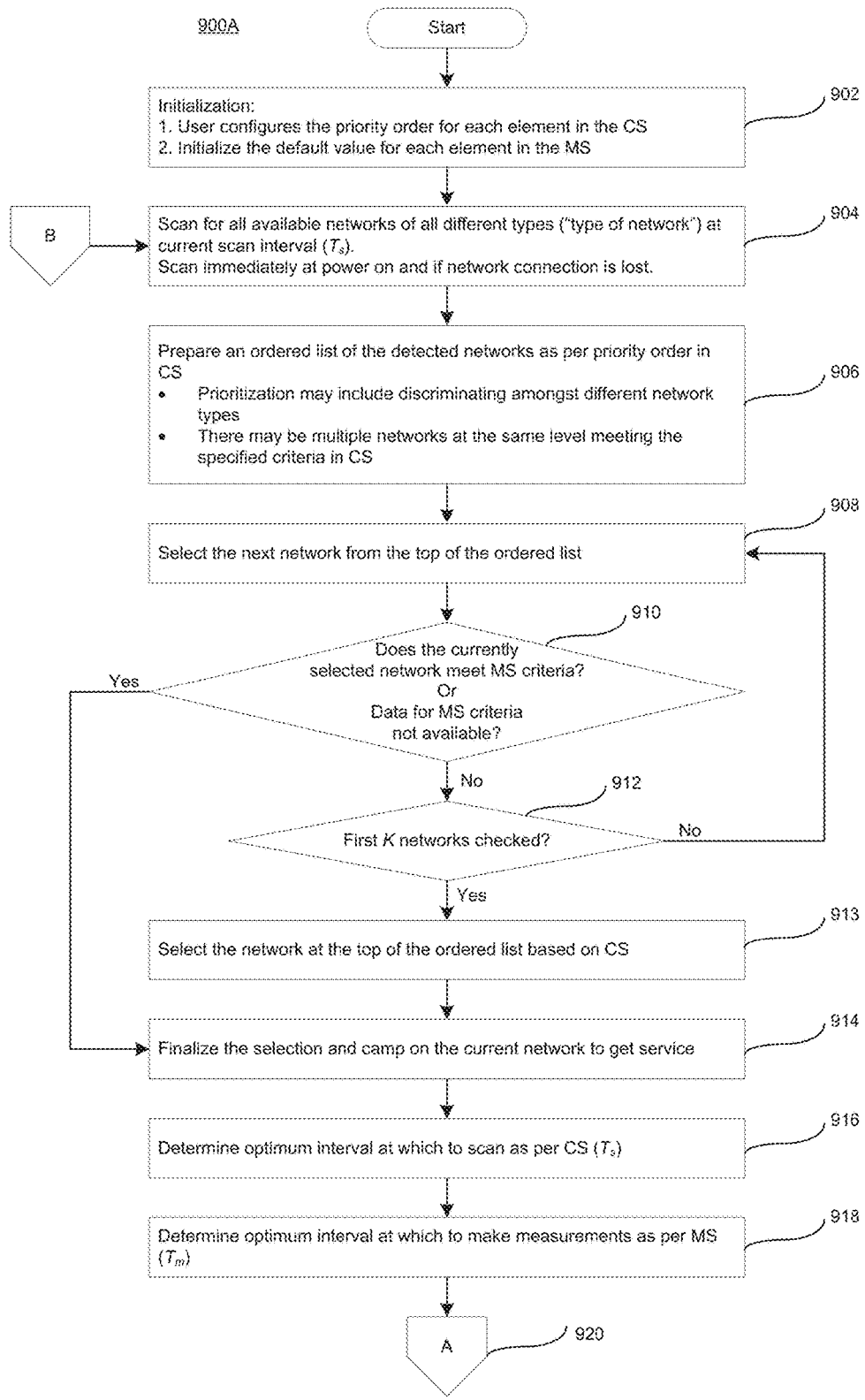

According to an aspect of the present disclosure, a client device may attempt to access internet service according to the ordered list of available networks using CS and MS. According to the aspects of the present disclosure, the ordered list of available networks may be created and updated as per the flow diagrams in FIG. 9A and FIG. 9B. The flow diagram 900A contained in FIG. 9A illustrates an exemplary method for selection of network for getting internet service according to the various aspects of the present disclosure. The processing relevant to the present disclosure begins in the processing stage 902 where the initialization is performed for the elements of CS and MS. The elements of CS may be initialized by a user through the user interface of the client device. In addition to the user configured values, the elements of CS may be configured by default. For example, the default settings may be a single selection criteria based on the "type of network." The elements of MS may be initialized to default nominal values. For example, at first time power-on, a client device may not have visited any network and therefore, the MS contents may be empty. As the client device begins to get internet service from different networks, the value of each element in the MS may be updated for each visited network. Some values may be set to zero by default until a connection is made from a particular network. For example, until internet service is obtained from a particular network, all the data rate related elements may be set to zero. At processing stage 904, the client device may scan for all available networks of all different types ("type of network") at current scan interval $T_s$, (time between two successive scans). When entering the processing stage 904 at power on, the scan may be performed immediately. At processing stage 906, an ordered list of the detected networks as per priority order in CS may be prepared. The prioritization may include discriminating amongst different "type of network." After applying the sorting criteria, there may be multiple networks at the same priority meeting the specified criteria in CS. For example, the user may have configured the wire-line Hotspot, followed by mobile Hotspot, and then followed by mobile broadband network as the type of network priority order. After the scan there may be three networks in the wire-line Hotspot type, another two networks of the mobile Hotspot type, and one network of mobile broadband type. At processing stage 908, the network at the top of the ordered list may be selected for getting internet service. At processing stage 910, a determination is made regarding whether the criteria from MS are met or not. For example, if a client device has found three Hotspot networks and the device has previously visited those networks, it may have the data rate information stored for each of the networks. At processing stage 910, the selection criteria based on one or more elements of MS may be applied. For example, the minimum data rate measured when the client device previously visited that network may be checked to determine whether the specified minimum data rate is possible with the currently selected network that meets the CS criteria. If the MS criteria are met, the processing continues to processing stage 914. If the measurements for the MS criteria are not available, for example, if a new network is detected, the processing continues to processing stage 914. If the measurements are available but MS criteria are not met, the processing continues at processing stage 912. At processing stage 912, a determination is made whether the first K networks from the ordered list have been processed for checking the MS criteria or not. If not all K networks have been checked, the processing returns to the processing stage 908. If all K networks have been checked, the processing continues to the processing stage 913. At processing stage 913, since none of the MS criteria are met, the network at the top of the ordered list based on CS is selected. At processing stage 914, the currently selected network is used for getting internet service and the client device may perform required registration procedure and may begin to get internet service. At processing stage 916, the optimum interval $T_s$ (time between two successive scans) at which to perform scanning as per CS may be determined. At processing stage 918, the optimum interval $T_m$ (time between two successive measurements) at which to make measurements as per MS is determined. The selection of the particular set of measurements to be done and used may be user configurable. For example, average data rate may be configured for data rate measurements and internet service selection. The processing flow then continues in the flow diagram 900B in FIG. 9B.

In FIG. 9B, at processing stage 922, if the current data rate is below the configured data rate threshold, the processing returns to processing stage 904 in FIG. 9A, otherwise the processing continues to processing stage 924. The particular type of data rate measurement used for comparison may be average data rate, peak data rate, or most recent connection data rate.

The client device may initiate measurements for MS elements while keeping the latency, jitter, data rate and other requirements of the currently running application into consideration. If the currently active connection is a delay sensitive application such as a voice or video call, the client device may defer the measurements for MS elements until the ongoing delay sensitive application such as a voice or video call has ended. If the currently active connection corresponds to a delay tolerant application such as file transfer, email, or internet browsing, the client device may not wait for the active connection to end and may initiate measurements for MS elements. At processing stage 924, a determination is made whether one or more currently running applications are latency and/or jitter sensitive. If they are, then the processing continues to processing stage 928, otherwise, the processing continues to processing stage 926. At processing stage 926, measurements for elements of MS are made on the currently selected network at the currently selected interval $T_m$. The measured metrics for the elements of MS for the currently selected network are saved for future reference. At processing stage 928, a determination is made whether to continue internet service selection as per CS and MS. This may be, for example, based on user input. If the periodic scanning for available networks is to be continued, the processing returns to processing stage 904 in FIG. 9A. If the periodic scanning is not to be continued, the processing suitably terminates at stage 930.

When a user is not using the client device, such as there is no user interaction with the client device for longer than configurable amount of time (e.g., 2 minutes), or when there is no active connection, for example, in case of Machine-2-Machine (M2M) type of application, then a client device may be considered to be not active. The user interaction may be monitored, for example, by "key press" or "screen touch" or whether any applications are running and if so the type of applications running, etc. on the client device. Similarly, when a user is interacting with the client device, or when there is an active connection, the client device may be considered to be active.

Further details of the processing stage 916 in FIG. 9A are described next. According to an aspect of the present disclosure, the interval $T_s$ for scanning available networks may be adapted dynamically as follows. The default value of the scanning interval $T_s$ may be, for example, 1 m. According to an aspect of the present disclosure, the default value of the scanning interval $T_s$ may be user configurable, for example, in the range from 30 seconds to 60 minutes, e.g., 30 s, 1 m, 5 m, 10 m, 30 m, and 60 m. According to an aspect of the present disclosure, when a client device is active, scanning may be more frequent to get access to better network sooner. According to an aspect of the present disclosure, when a client device is not active then the scanning may be less frequent, for example, the scanning interval value may be four times of the scanning interval value when the user is active. According to an aspect of the present disclosure, when a client device is connected to an external power supply (e.g., being charged), the scanning for available networks may be more frequent. According to an aspect of the present disclosure, if the client device is battery operated and not connected to an external power supply then the scanning for available networks may be less frequent. According to an aspect of the present disclosure, when a client device battery level is below certain configurable threshold then the scanning for available networks may be even further less frequent. According to an aspect of the present disclosure, when a client device is already connected to a network that meets all the user configured selection criteria in CS and MS, the scanning may be less frequent. According to an aspect of the present disclosure, in the most recent N scans, if no new network is available to get service, then the scanning may be less frequent until a new network with service availability is found. Here N is a configurable parameter for the number of scans to be done at scanning interval $T_s$ determined in processing block 916 before the scanning interval value is increased. The value of N, for example, may be 5.

Further details of the processing stage 918 in FIG. 9A are described next. According to an aspect of the present disclosure, the measurement interval $T_m$ for making measurements for MS elements on the currently selected network may be adapted dynamically as follows. According to an aspect of the present disclosure, if the currently selected network is a WWAN such as $3^{rd}$ Generation Partnership Project (3GPP) Long Term Evolution (LTE) or any conventional mobile network such as Global System for Mobile Communications (GSM), General Packet Radio Service (GPRS), Wideband Code Division Multiple Access (WCDMA), Evolution-Data Optimized (EVDO), Code Division Multiple Access (CDMA) 1× as the internet data service, the data rate test may be more frequent and user configurable. For example, the data rate test may be performed in the range of once every 30 seconds to once every 10 minutes, or other intermediate intervals. According to an aspect of the present disclosure, if the network has low Peak to Average Data Rate Ratio (PADRR) then the measurements for MS elements may be done less frequently. The low PADRR may indicate more consistent allocation of resources by the network. According to an aspect of the present disclosure, if the network has higher PADRR then the measurements for MS elements may be done more frequently. According to an aspect of the present disclosure, a PADRR of $T_{PADRR}$ or lower may be considered low and a ratio higher than $T_{PADRR}$ may be considered high. The value for $T_{PADRR}$, for example, may be 1.5. According to an aspect of the present disclosure, $T_{PADRR}$ may be configurable. According to an aspect of the present disclosure, if the currently selected network has a wired connection (e.g., DSL, cable modem, T1 line, etc.) for the internet service then the measurements for MS elements may be performed less frequently as the conditions for such networks are not expected to vary frequently and the value of PADRR may not change significantly. Typically a fixed bandwidth may be allocated to a client device from such a network. According to an aspect of the present disclosure, for a network if the PADRR remains the within a certain defined range such as PADRR±Δ for multiple measurements of MS elements (e.g., 20 measurements) at the interval of, e.g., 2 minutes, then the measurements for MS elements may be performed less frequently, e.g., every 5 hours. The value of Δ may be user configurable, for example, 0.2.

Further details of the processing stage 926 in FIG. 9B are described next. According to an aspect of the present disclosure, the average data rate element of MS may be estimated based on configurable parameters, for example, the duration over which averaging is performed. According to an aspect of the present disclosure, the peak data rate may be estimated based on configurable parameters, for example, the duration over which the peak data rate search is performed. According to an aspect of the present disclosure, different methods for computing the average data rate and searching peak data rate may be employed. For example, the averaging may be a block averaging or sliding window averaging. Similar configurable averaging may be used for other elements of MS.

Continuing with the further details of the processing stage 926 in FIG. 9B, according to an aspect of the present disclosure, a data rate test may be performed by sending test data packets to the network and receiving test packets from the network. For example, the ping test using the Internet Control Message Protocol (ICMP) may be used. It is a type of echo test that determines the latency between two connected entities. It may be also used for data rate test by using larger packet sizes. Other methods of performing data rate tests may be used as well.

Continuing with the further details of the processing stage 926 in FIG. 9B, according to an aspect of the present disclosure, the "network switching rate" element of MS may be maintained in the client device by counting the number of times a network is switched along with the reason for the network switch.

Continuing with the further details of the processing stage 926 in FIG. 9B, according to an aspect of the present disclosure, if a network is not available for a configurable amount of time $T_u$, it may be removed from the list of K most recently visited networks. For example, $T_u$ may be 5 minutes.

Continuing with the further details of the processing stage 926 in FIG. 9B, according to an aspect of the present disclosure, if a new network is detected and a free entry exists in the list of K most recently visited networks, the new network may be added to the list. If the list is full, the oldest entry in the list based on the keep-alive time stamp may be replaced with the newly found network. If the keep-alive time stamp is the same then the network with the lower-order priority or lower average data rate may be removed to make room for the newly detected network entry in the list if, for example, a data rate measured on the newly detected network is higher than a same type of data rate measured for any of the networks in the list of K most recently visited networks. The particular type of data rate measurement used for comparison may be average data rate, peak data rate, or most recent connection data rate. The selection of the particular data rate measurement used may be user configurable or may be combined with the user configured priority specified for CS.

Further details of the processing stage 910 in FIG. 9A are described next. According to another aspect of the present disclosure, the client device may use hysteresis when performing internet service selection according to the MS criteria. According to another aspect of the disclosure, the use of hysteresis may prevent frequent switching of the network for small differences in the measurements.

Continuing with the further details of the processing stage 910 in FIG. 9A, according to another aspect of the disclosure, the selection of a network for internet service may be autonomous instead of being user configured. According to an aspect of the disclosure, the PADRR, average connection session duration, the most recent connection data rate and the last session duration of the K most recently visited networks may be used to evaluate the dynamic switching of the networks as a function of the application type. According to an aspect of the disclosure, a table may be prepared that lists the preferred highest priority attribute from CS or MS or combination of CS and MS based on the type of application that is running in the client device. When a particular application is running, the client device may look up the table and use the looked up attribute from the table for internet service selection. For example, in case of real time applications such as a video call, internet service with high average data rate but with low PADRR may be prioritized. For example, in case of large file transfer, internet service from a network with the most stable connection, i.e., the network with the longest average connection session duration may be prioritized. For example, in case of a small file transfer, internet service from a network with the highest most recent connection data rate may be prioritized.

According to another aspect of the present disclosure, if a client device is connected to a network and a connection to it is lost, then the client device may immediately perform scan for all available networks as part of the processing stage 904 and from the detected networks the client device may automatically connect to one of the detected network according to CS, MS or combination of both as per the aspects of the present disclosure.

According to the aspects of the present disclosure, the internet service selection criteria may be different for different mobility conditions. For example, if a client device is in stationary conditions, the likelihood of signal conditions changing is lower. Therefore, the scanning for new networks and various measurements for MS elements may be performed less frequently as part of the processing stages 916 and 918 respectively. In addition, other parameters of the internet service selection criteria may be adapted. On the other hand, if a client device is in high mobility conditions, the likelihood of signal conditions changing is higher. Therefore, the scanning for new networks and various measurements for data rate may be performed more frequently as part of the processing stages 916 and 918 respectively. In addition, other parameters of the internet service selection criteria may be adapted. There may be other scenario specific set of values of CS and MS for internet service selection criteria.

Figure 10:
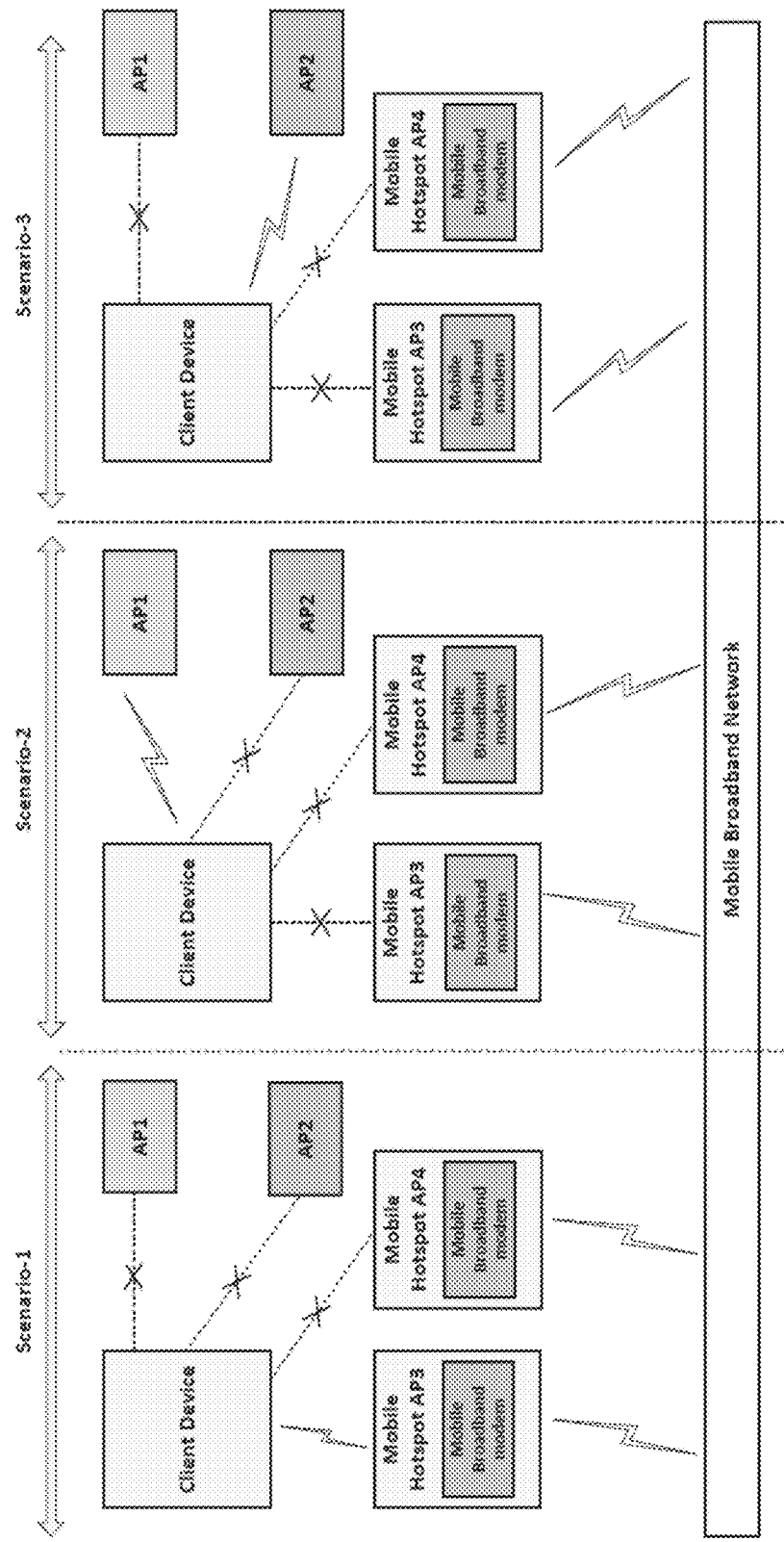
FIG. 10 illustrates a use case of adaptive selection procedure for internet access according to the aspects of the present disclosure.

The aspects of the present disclosure which are described above are further illustrated through different use cases. An example use case is shown in FIG. 10. In FIG. 10 there are four different sources of internet access to select from for the client device such as a tablet which may have WLAN access connectivity but may not have mobile broadband access connectivity. The four sources of internet access include the two Hotspot APs referred to as AP1 and AP2, mobile Hotspot AP3, and mobile Hotspot AP4. The AP1 and AP2 may be providing internet service via wire-line network such as DSL, cable modem, or some other means. In the present example, the AP1 and AP2 may have internet service attributes, for example, average data rate element of the MS, such that they may be ranked above the mobile Hotspot AP3 and mobile Hotspot AP4 in the client device selection criteria based on the average data rate element of CS. As shown in FIG. 10, the client device may receive internet service from any one of the four different sources of internet access depending on the scenarios as shown in FIG. 10 and described below.

In Scenario-1 of FIG. 10, the client device is in a location where the service from AP1 and AP2 may not be available. As per the aspects of the present disclosure, the client device may select the mobile Hotspot AP3 for getting internet service based on the stored user preferences and internet service attributes, for example, the average data rate element of the MS and the average data rate element of the CS of the mobile Hotspot AP3 and the mobile Hotspot AP4.

As the client device moves towards a location where the service from AP1, becomes available and service from AP2 is not available, the scenario transitions from Scenario-1 to Scenario-2 in FIG. 10. As per the aspects of the present disclosure, for example, based on the "type of network" element configured to prefer the wire-line Hotspot AP in the CS, the client device may disconnect from the mobile Hotspot AP3 and may start receiving service from AP1 over the WLAN air-interface.

When the client device moves towards a location where, in addition to AP1, internet service from AP2 also becomes available, the scenario transitions from Scenario-2 to Scenario-3 in FIG. 10. As per the aspects of the present disclosure, for example, based on the average data rate element of the MS and the average data rate element of the CS, while continuing to give priority to wire-line Hotspot AP, the client device may start receiving service from AP2 over the WLAN air-interface which may offer higher average data rate than AP1.

As the client device moves away from a location where service from both AP1 and AP2 is available and towards a location where the average data rate for internet service from AP1 or from AP2 may begin to decline and fall below the configured threshold for average data rate and service from mobile Hotspot AP3 is available and has higher average data rate than the configured threshold for average data rate, the scenario transitions from Scenario-3 to Scenario-1 in FIG. 10. In Scenario-3, the client device is already connected to AP2 for internet access. As per the aspects of the present disclosure, as the scenario transitions from Scenario-3 to Scenario-1, for example, based on the average data rate element of the CS and MS falls below the configured average data rate threshold, the client device starts receiving service from the mobile Hotspot AP3.

Figure 11:
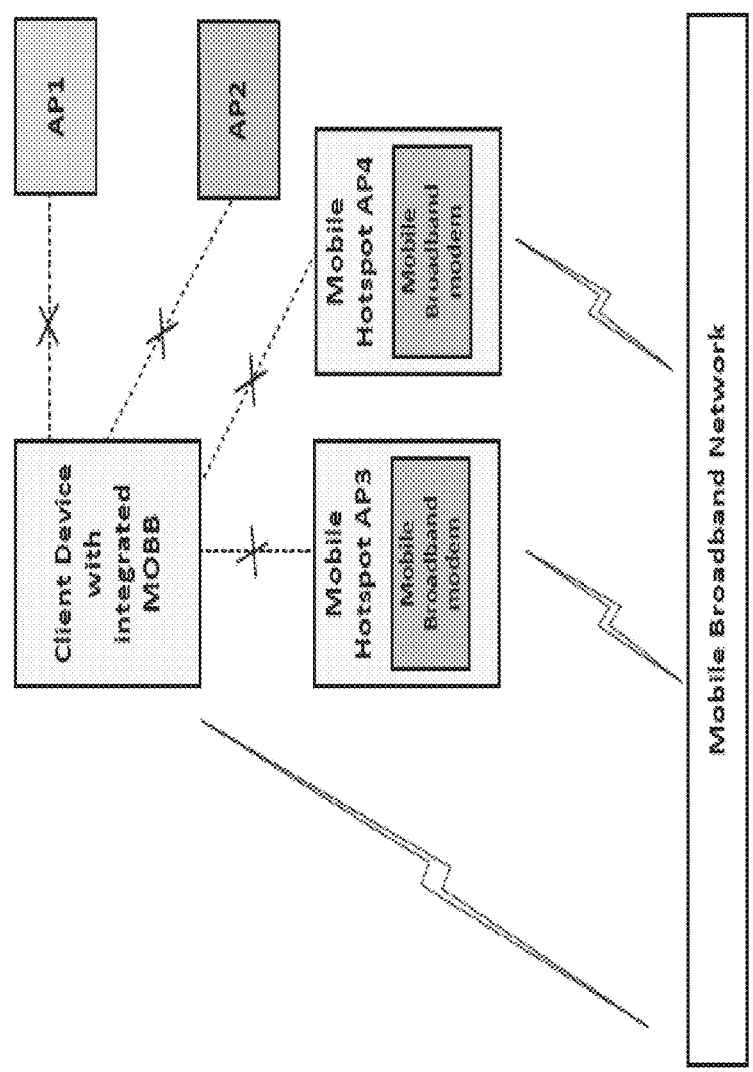
FIG. 11 illustrates the use case of a client device connecting to mobile broadband network for internet service according to the aspects of the present disclosure.

FIG. 11 illustrates the scenario where the client device, such as a smartphone, has the mobile broadband (MOBB) capability integrated into it. As per the aspects of the present disclosure, the client device may be in an area where the internet service from its own mobile broadband modem, or from the mobile Hotspot AP3, or mobile Hotspot AP4 may be available but where service from wire-line Hotspots AP1 and AP2 may not be available as shown in FIG. 11. The selection amongst the available internet service sources may be done according to the ordered list based on the user configured priorities. For example, in FIG. 11 the client device is connected to the mobile broadband network directly using its internal mobile broadband modem. This selection may be based on user configuration about whether to use public Hotspot or public mobile Hotspot connection for sensitive information, i.e., the security element in CS.

Figure 12:
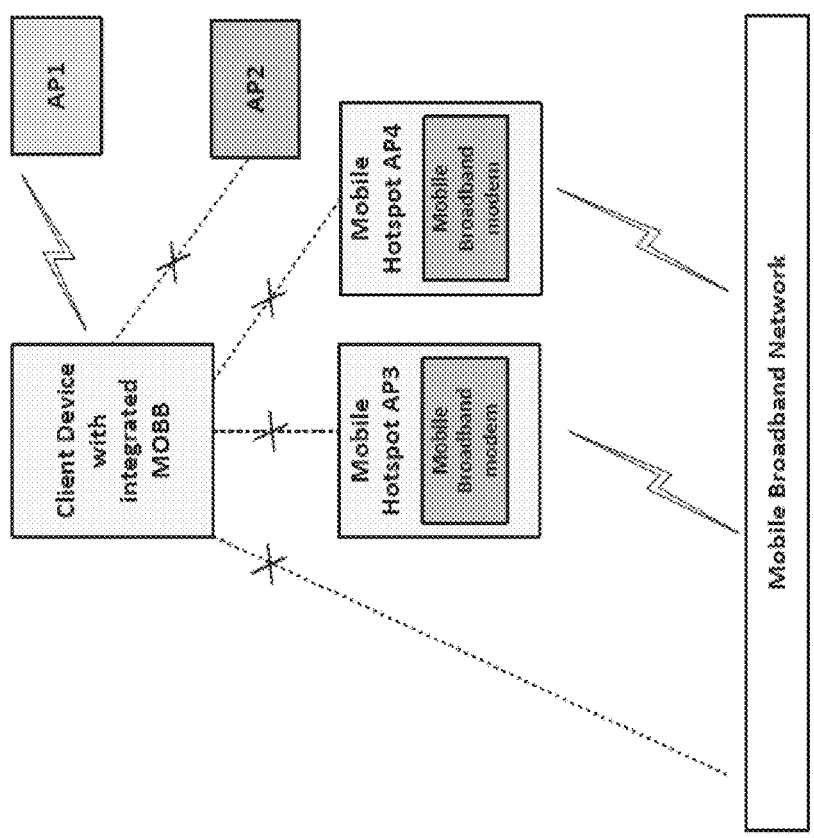
FIG. 12 illustrates the use case of a client device connecting to Hotspot AP1 for internet service even when mobile broadband network, mobile Hotspot AP3, and mobile Hotspot AP4 are available for service according to the aspects of the present disclosure.

FIG. 12 illustrates the scenario where the client device is an area where it gets internet service using AP1 which may be a home AP and it may have a secure WLAN connection. It may also be a lower cost, higher average data rate AP compared to the average data rate of internet service from mobile broadband network. This selection may be based on the priority configuration by the user for the cost, security, and average data rate elements of the CS.

Figure 13:
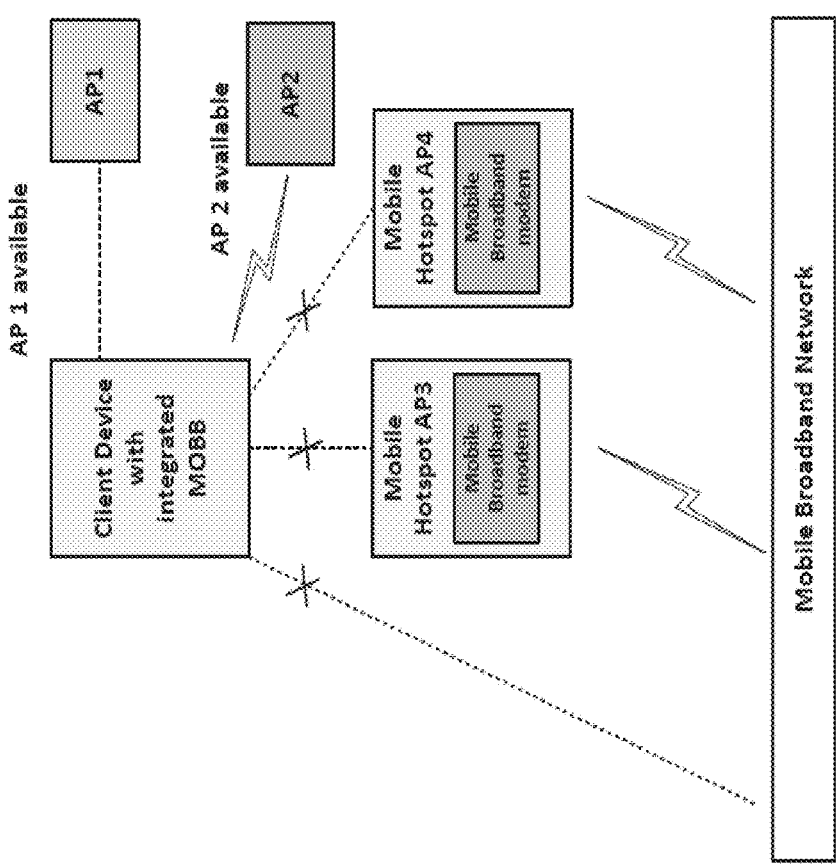
FIG. 13 illustrates the use case of a client device connecting to Hotspot AP2 for internet service even when mobile broadband network, Hotspot AP1, mobile Hotspot AP3 and mobile Hotspot AP4 are available for service according to the aspects of the present disclosure.

FIG. 13 illustrates the scenario where the client device is in an area where it may get internet service using AP2 which may provide higher average data rate. This selection may be based on the priority configuration by the user for cost, security, and data rate elements of CS as well as the average data rate element of MS updated using data rate tests. In this case even though the AP1 is available, the client device selects the AP2 because of higher average data rate support in AP2.

The client device may provide an interface to the user for configuration of internet selection criteria. According to the aspects of the present disclosure, the user may enter the information about the priority of different criteria in selection of the networks for internet service. For example, one user may set the priority for internet access such that it may lead to lower power consumption. On the other hand, another user may set the priority for access such that it may lead to reduced cost. According to the aspects of the present disclosure, the user may also provide information about the attributes of the internet access of each of the networks. According to another aspect of the present disclosure, the client device may automatically generate the selection criteria based on the information provided by the networks and based on the past user preferences for selection of the network for internet access.

According to the aspects of the present disclosure, the selection criteria may allow to override user configured order of priority for network selection under user control. According to the aspects of the present disclosure, the user may enable or disable the automatic selection of the best available network.

The invention claimed is:

1. A method for selecting an available network for accessing internet service, the method comprising:
controlling, by a processing device, at a client device,
setting selection criteria for accessing internet service;
storing service attributes respectively of networks previously visited by the client device, wherein the service attributes for a given network of the networks previously visited are indicated in a given measurement set (MS) for the given network, and wherein the given MS indicates given MS elements which are measurable at the client device at least one of when establishing a connection with the given network, during the connection with the given network, or when switching from the given network to a different second network;
periodically updating an ordered list of available networks using the selection criteria and the service attributes respectively of the networks previously visited, and based on network availability at a given time; and
selecting a selected network from the ordered list.

2. The method of claim 1, wherein the selection criteria includes at least one of type of network, cost of network service, privacy, security, data rate, latency or jitter.

3. The method of claim 2, wherein the type of network includes at least one of a Hotspot, mobile Hotspot, mobile broadband network or roaming mobile broadband network.

4. The method of claim 2, wherein the data rate includes at least one of minimum data rate, peak data rate, average data rate or guaranteed data rate.

5. The method of claim 1, wherein at least one selection criterion of the selection criteria is selectable by a user as a priority selection criterion for selecting the selected network.

6. The method of claim 1, wherein a priority of a first selection criterion of the selection criteria is different from or same as a priority of a second selection criterion of the selection criteria, for selecting the selected network.

7. The method of claim 1, wherein MS information is stored respectively for a predetermined maximum number of the networks previously visited.

8. The method of claim 1, wherein a first selection criterion of the selection criteria is based on a first measurement obtained for a first measurement element of a first MS for a first network of the networks previously visited.

9. The method of claim 1,
wherein the given MS for the given network includes, as a first MS element, at least one of a keep-alive time stamp for a most recent scan result, a duration of a most recent connection, average duration of a connection, reason for switching from a last network, network switching rate, data rate obtained during a last connection, number of random access attempts before a response is received from the given network when attempting to establish a connection during a last visit, block Error Rate or block retransmission rate.

10. The method of claim 9, wherein the reason for switching includes at least one of connection lost, data rate, cost or security.

11. The method of claim 9, wherein the data rate obtained during the last connection includes at least one of minimum data rate, peak data rate or average data rate.

12. The method of claim 1, wherein a first selection criterion of the selection criteria is other than from MS information.

13. The method of claim 1, further comprising:
controlling, by the processing device, accessing internet service at the client device using the selected network.

14. The method of claim 1, further comprising:
when a currently active connection to a first network at the client device is a delay sensitive application, controlling, by the processing device, deferring measuring first MS elements for the first network until the delay sensitive application is ended.

15. The method of claim 14, wherein the delay sensitive application is a voice or video call.

16. The method of claim 1, further comprising:
when a currently active connection to a first network at the client device is a delay tolerant application, controlling, by the processing device, measuring first MS elements for the first network while the active connection is ongoing and without waiting until the active connection ends.

17. The method of claim 1, further comprising:
controlling, by the processing device, when the client device is currently connected to a first network which is determined to satisfy selected one or more of the selection criteria and the MS elements respectively of the networks previously visited, scanning for an available network at a first scan interval smaller than a predetermined value.

18. The method of claim 1, further comprising:
controlling, by the processing device,
when the selected network has a Peak to Average Data Rate Ratio (PADRR) less than or equal to a threshold $T_{PADRR}$, performing measurements for the MS elements of the selected network at a measurement interval greater than a predetermined value, and
when the selected network has the PADRR greater than the threshold $T_{PADRR}$, performing measurements for the MS elements of the selected network at the measurement interval greater less than the predetermined value.

19. The method of claim 1, further comprising:
controlling, by the processing device, when the selected network has a wired connection for internet service, performing measurements for the MS elements of the selected network at a measurement interval greater than a predetermined value.

20. The method of claim 1, further comprising:
controlling, by the processing device, generating a table listing preferred highest priority attribute from at least one of the service attributes or the MS elements respectively of the MS s of the networks previously visited, according to a type of application.

21. The method of claim 20, further comprising:
controlling, by the processing device, determining a potential selected network using the table and based on a given type of application running on the client device.

22. The method of claim 1, wherein at least one of the setting of the selection criteria or measuring first MS elements of a first network are performed according to a mobility condition of the client device.

23. A method for selecting an available network for accessing internet service, the method comprising:
controlling, by a processing device, at a client device,
setting selection criteria for accessing internet service;
storing service attributes respectively of networks previously visited by the client device;
when the client device is active, scanning for an available network according to the selection criteria at a first scan interval smaller than a predetermined value;
when the client device is not active, scanning for an available network according to the selection criteria at a second scan interval greater than the predetermined value;
periodically updating an ordered list of available networks using the selection criteria and the service attributes respectively of the networks previously visited, and based on network availability at a given time; and
selecting a selected network from the ordered list.

24. A method for selecting an available network for accessing internet service, the method comprising:
controlling, by a processing device, at a client device,
setting selection criteria for accessing internet service;
storing service attributes respectively of networks previously visited by the client device;
when the client device is connected to an external power supply, scanning for an available network according to the selection criteria at a first scan interval smaller than a predetermined value;
when the client device is not connected to the external power supply and operating using power from a battery of the client device, scanning for an available network according to the selection criteria at a second scan interval greater than the predetermined value;
updating an ordered list of available networks using the selection criteria and the service attributes respectively of the networks previously visited, and based on network availability at a given time; and
selecting a selected network from the ordered list.

25. An apparatus for selecting an available network for accessing internet service, the apparatus comprising:
circuitry configured to control
setting selection criteria for accessing internet service;
storing service attributes respectively of networks previously visited by the client device, wherein the service attributes for a given network of the networks previously visited are indicated in a given measurement set (MS) for the given network, and wherein the given MS indicates given MS elements which are measurable at the client device at least one of when establishing a connection with the given network, during the connection with the given network, or when switching from the given network to a different second network;
periodically updating an ordered list of available networks using the selection criteria and the service attributes respectively of the networks previously visited, and based on network availability at a given time; and
selecting a selected network from the ordered list.

26. A wireless communication device comprising:
a receiver to receive a wireless communication signal; and
a processing device configured to control selecting an available network for accessing internet service,
wherein the processing device is configured to control
setting selection criteria for accessing internet service;
storing service attributes respectively of networks previously visited by the client device, wherein the service attributes for a given network of the networks previously visited are indicated in a given measurement set (MS) for the given network, and wherein the given MS indicates given MS elements which are measurable at the client device at least one of when establishing a connection with the given network, during the connection with the given network, or when switching from the given network to a different second network;
periodically updating an ordered list of available networks using the selection criteria and the service attributes respectively of the networks previously visited, and based on network availability at a given time; and
selecting a selected network from the ordered list.

* * * * *